Nov. 25, 1941.                E. MARTIN                 2,264,089
                        HYDRAULIC CONTROL DEVICE
                          Filed May 25, 1939
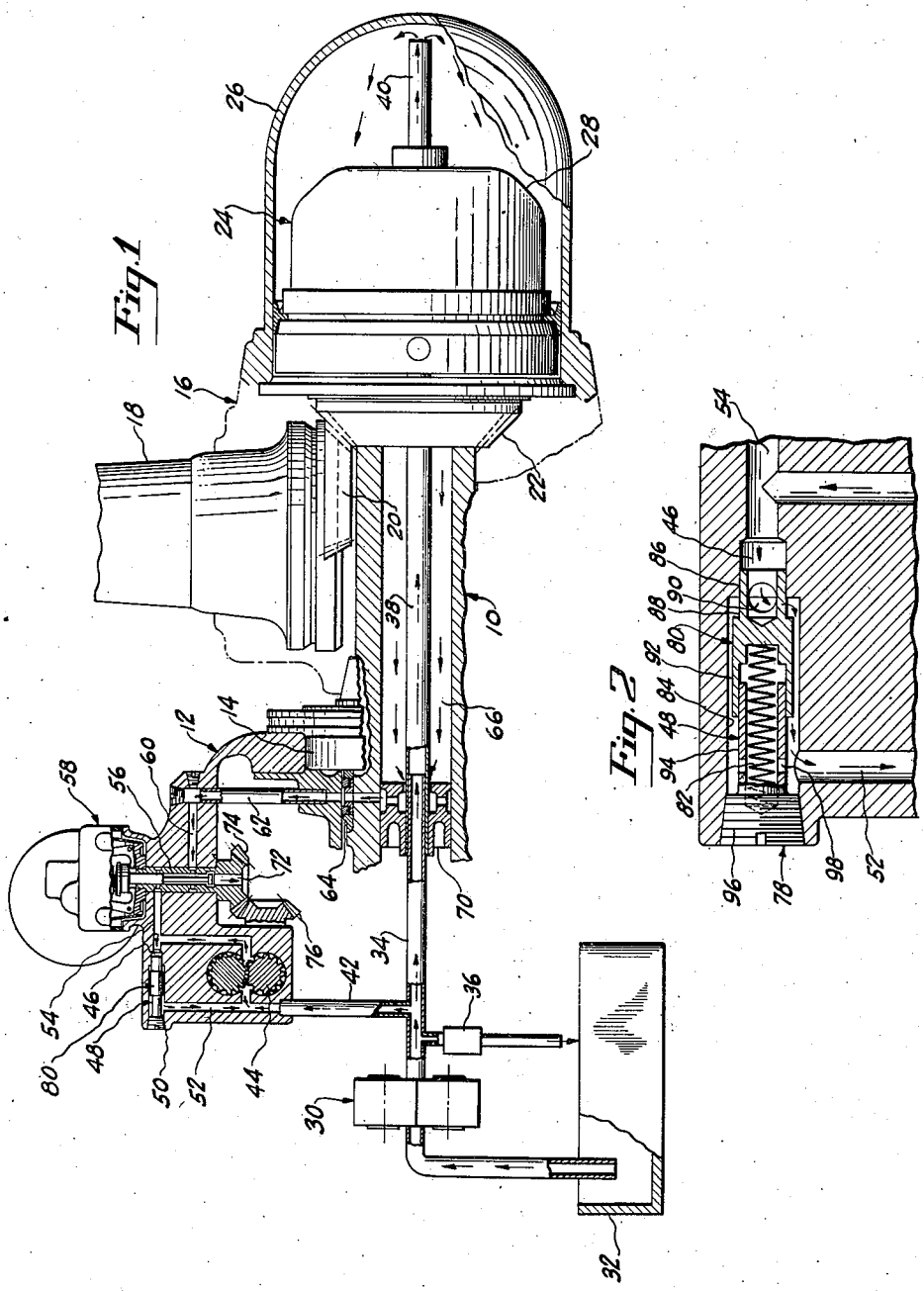
INVENTOR
*Erle Martin*
BY *Harris G. Luther*
ATTORNEY Patented Nov. 25, 1941

2,264,089

UNITED STATES PATENT OFFICE 2,264,089

HYDRAULIC CONTROL DEVICE

Erle Martin, West Hartford, Conn., assignor to United Aircraft Corporation, East Hartford, Conn., a corporation of Delaware Application May 25, 1939, Serial No. 275,618

9 Claims. (Cl. 170—163)

This invention relates to improvements in hydraulic control devices and has particular reference to an improved pressure regulating valve for a hydraulic servo-motor.

An object of the invention resides in the provision of a pressure relief valve for an auxiliary or booster pump which is responsive to the pressure of the primary or main pump to maintain the pressure at the booster pump outlet a predetermined amount above the pressure developed by the main pump.

A further object resides in the provision of an improved control for a hydraulic mechanism subjected to hydraulic fluid at two different pressures and operative to maintain the higher pressure always a predetermined amount above the lower pressure.

A further object resides in the provision of a propeller control system and means for maintaining a margin of operating pressure therein regardless of the primary pump pressure.

Other objects and advantages will be more particularly pointed out hereinafter or will become apparent as the description proceeds.

In the accompanying drawing, in which like reference numerals are used to designate similar parts throughout, there is illustrated by way of example a particular mechanical arrangement of a hydraulic servo-mechanism and an improved pressure relief valve constructed according to the invention. The drawing, however, is for the purpose of illustration only and is not to be taken as limiting or restricting the scope of the invention.

In the drawing, Fig. 1 is a partly schematic sectional view of a hydro-controllable propeller, a propeller speed regulating governor, a governor servo-mechanism and a pressure relief valve constructed according to the invention, and Fig. 2 is a sectional view on an enlarged scale of the improved pressure relief valve shown in Fig. 1.

Referring to the drawing in detail, the numeral 10 generally indicates a propeller drive shaft projecting from the front end of an engine, generally indicated at 12, through an anti-friction thrust bearing, generally indicated at 14. The propeller includes a hub structure schematically shown at 16 within which are rotatably mounted a plurality of blades one of which is generally indicated at 18 movable to different pitch positions to control the speed of the engine 12 by means of a gear train including the elements 20 and 22, the driving element 22 of which is actuated by a hydraulic motor, schematically shown at 24, enclosed in the fluid tight dome or cylinder 26. The motor 24 includes a piston 28 movable in the cylinder 26 in one direction or the other depending upon the preponderance of fluid pressure on the opposite sides thereof. Reciprocating movements of this piston are transmitted into rotational movements of the gear 22 by a suitable mechanical connection various forms of which are well known to the prior art, a suitable form being particularly illustrated and described in applicant's prior application, United States Application Serial Number 184,792, filed January 13, 1938, by Erle Martin for Feathering propeller control.

The numeral 30 generally indicates a fluid pump, such as the engine lubricating oil pump, which draws lubricating oil from some suitable source, such as the reservoir 32, and forces it into the engine lubricating feed line 34. The pressure in the feed line may be controlled by a pressure relief valve 36 arranged to return a portion of the oil delivered by the pump 30 to the reservoir 32 whenever the pressure in the line 34 exceeds a predetermined amount. One conduit 38 leads directly from the oil line 34 to one side of the piston 28, and in the device illustrated, extends at 40 to the space between the front end of the piston 28 and the closed end of the cylindrical dome 26. This arrangement maintains oil at engine oil pressure on the forward side of the piston 28 at all times to assist the effect of centrifugal force acting on the blades 18 to turn the blades towards their low pitch position.

A second conduit 42 leads from the oil line 34 to the intake of the booster pump 44 which increases the pressure of the oil supplied thereto to a value above that maintained by the pressure relief valve 36. Oil at the increased pressure is delivered by the booster pump 44 to a pressure chamber 46 where its pressure is regulated by the pressure relief valve generally indicated at 48 and illustrated in detail in Fig. 2. This valve, which will be described in detail later, permits excess oil to flow from the pressure chamber 46 through the valve chamber 50 and the return line 52 back to the intake of the pump 44 so that the pump 44 will not unnecessarily rob the oil line 34 but, if it pumps an amount in addition to that required for propeller control this amount will merely be recirculated through the booster pump, instead of being returned to the reservoir and having to be brought back to the booster pump by the main oil pump 30.

A lead 54 from the pressure chamber 46 goes to a valve, generally indicated at 56, controlled by the speed responsive governor, generally indicated at 58, which valve is connected with the propeller through the supply lines 60 and 62, the oil collector ring 64 and the channel 66 in the shaft 10 surrounding the conduit 38 between the propeller and the plug 70. The valve is also connected with the oil sump or reservoir 32 through a drain channel 72 which extends through the hollow governor drive gear 74 which meshes with the engine driven gear 76.

The valve 56 is controlled by the governor 58 in a manner such that when the engine speed is low the valve will connect the propeller supply line 60 with drain through the drain channel 72 thereby permitting centrifugal force acting on the blades and the pressure of the oil from the conduit 38 on the forward side of the piston 28 to decrease the pitch of the propeller and cause the engine to speed up and, when the engine speed is high, to connect the line 54 with the line 60 to permit oil from the booster pump 44 to flow to the rearward side of the piston 28 and move the piston against the action of centrifugal force acting on the blade and the pressure of the lubricating oil in the forward end of the cylinder 26 to increase the pitch of the propeller and slow the engine down by increasing its load. As the hydraulic fluid from the pump 44 must overcome the pressure of the fluid from the pump 30 acting on the forward side of the piston 28 as well as the effect of centrifugal force acting on the blades and the frictional resistance to turning of the blades, it is necessary that the pressure of the fluid in the pressure chamber 46 be at all times higher than the pressure of the fluid in the forward end of the cylinder 26 by a predetermined amount. This object is accomplished by the special construction of the pressure relief valve 48. This valve comprises a fixed element 78, a movable element 80 and a valve spring 82 disposed in a cylindrical valve chamber 84 preferably provided in the casing of the hydraulic servo-mechanism. The chamber 84 has an open end and a reduced extension 86 at the opposite end leading into the pressure chamber 46. The member 80 has a hollow cylindrical reduced portion 88 which has a sliding fit in the valve chamber portion 86, and is provided with an aperture or port 90, and with an enlarged cylindrical portion 92 which telescopes over and slides upon the hollow cylindrical portion 94 of the member 78 which member also includes an enlarged externally threaded end portion 96 adapted to be screw threaded into the open end of the valve chamber 84. The spring 82 is disposed in the member 94 and bears against the member 80 tending to urge this member to a position to bring the port 90 entirely within the reduced portion 86 and thereby prevent flow of oil from the pressure chamber 46 through the valve. When the pressure in the chamber 46 exceeds the pressure for which the valve is set the member 80 will be forced towards the left as viewed in Fig. 2 thereby bringing a portion of the port 90 into the enlarged portion of the chamber 84 and permitting oil to flow from the pressure chamber 46 through the enlarged portion of the valve chamber to the return channel 52 and so back to the booster pump inlet. The cylindrical portion of the member 48 is substantially of the same area as the reduced portion 86 of the member 80 and is provided with one or more ports or apertures, as indicated at 98, through which hydraulic fluid in the valve chamber and the conduit 52 may flow into the interior of the member 78 and act against the member 80 in the same direction as the spring 82. As the channel 52 is connected at all times with the oil line 34 the pressure in the valve chamber and in the interior of the member 78 will always be the same as that in the oil line 34 and in the closed end of the cylinder 26. Thus the valve 48 will be urged towards its closed position by a force equal to the force of the oil pressure in the member 78 plus the force of the spring 82 and, to open, will require a pressure in the pressure chamber 46 equal to the oil line pressure plus the pressure necesary to overcome the spring 82. The pressure in the pressure chamber will, therefore, always exceed the pressure in the oil line, when the pump 44 is operating, by the pressure required to overcome the spring. This construction enables the governor controlled fluid to overcome the force exerted on the piston 28 by the fluid at the oil line pressure in addition to the resistance due to the action of centrifugal force on the propeller blades.

While a particular mechanical arrangement has been hereinabove described and illustrated in the accompanying drawing for the purpose of disclosing the invention, it is to be understood that the invention is not limited to the particular arrangement so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In combination with a hydro-controllable propeller having a pitch changing motor operable in one direction by one fluid pressure and operable in the opposite direction by a second fluid pressure acting against said one fluid pressure, a hydraulic servo-mechanism including a pump, means for supplying hydraulic fluid at said one pressure to said pump, a pressure chamber for receiving the output of said pump, a pressure relief valve for said pressure chamber for establishing said second pressure, a spring urging said valve to closed position, means for applying the pressure of the hydraulic fluid supplied to said pump to said valve to exert a valve closing force in addition to the force exerted by said spring to maintain said second pressure a predetermined amount above said one pressure, and means for alternatively connecting one side of said pitch changing motor with said second pressure or with drain.

2. In combination with a hydro-controllable propeller having a pitch changing motor operable in one direction by one fluid pressure and operable in the opposite direction by a second fluid pressure acting against said one fluid pressure, a hydraulic servo-mechanism including a pump, means for supplying hydraulic fluid at said one pressure to said pump, a pressure chamber for receiving the output of said pump, a pressure relief valve for said pressure chamber for establishing said second fluid pressure, a spring urging said valve to closed position, means for applying the pressure of the hydraulic fluid supplied to said pump to said valve to exert a valve closing force in addition to the force exerted by said spring to maintain said second pressure a predetermined amount above said one pressure, means for continuously connecting one side of said pitch changing motor with said one fluid pressure, and means for alternatively connecting the opposite side of said pitch changing motor with said second fluid pressure or with drain.

3. In combination with a hydro-controllable propeller having a pitch changing motor operable in one direction by one fluid pressure and operable in the opposite direction by a second fluid pressure acting against said one fluid pressure, a hydraulic servo-mechanism including a pump, means for supplying hydraulic fluid at said one pressure to said pump, a pressure chamber for receiving the output of said pump, a pressure relief valve for said pressure chamber for establishing said second pressure, a spring urging said valve to closed position, means for applying said one hydraulic fluid pressure to said valve to exert a valve closing force in addition to the force exerted thereon by said spring to maintain said second pressure a predetermined amount above said one pressure, means continuously connecting one side of said pitch changing motor with said one fluid pressure, means for alternatively connecting the opposite side of said pitch changing motor with said second pressure or with drain, and a speed responsive governor for controlling the operation of said alternatively acting connecting means.

4. In combination with a hydro-controllable propeller having a pitch changing motor operable in one direction by one fluid pressure and operable in the opposite direction by a second fluid pressure acting against said one fluid pressure, a hydraulic servo-mechanism including a pump, means for supplying hydraulic fluid under said one pressure to the intake of said pump, a fluid chamber connected with the outlet of said pump, means connecting said chamber with said pump intake, a pressure relief valve in said connecting means to establish said second fluid pressure, means resiliently urging said valve to closed position to block said connecting means, means including a movable element for applying the pressure of the hydraulic fluid at said pump intake to add a valve closing force to the valve closing force exerted by said resilient means to maintain said second pressure a predetermined amount above said one pressure, means continuously connecting one side of said pitch changing motor with said one fluid pressure, and means for alternatively connecting the opposite side of said pitch changing motor with said second pressure or with drain.

5. In combination with a hydro-controllable propeller having a pitch changing motor operable in one direction by one fluid pressure and operable in the opposite direction by a second fluid pressure acting against said one fluid pressure, a hydraulic servo-mechanism including a pump, means for supplying hydraulic fluid under said one pressure to the intake of said pump, a fluid chamber connected with the outlet of said pump, a pressure relief valve connected with said chamber to establish said second fluid pressure and urged toward open position to vent said chamber by the pressure of hydraulic fluid in said chamber, means for applying the pressure of hydraulic fluid at said one pressure to said valve to counteract the effect of an equal pressure in said fluid chamber tending to open said valve, means in addition to said fluid pressure resiliently urging said valve toward closed position to maintain said second pressure a predetermined amount above said one pressure, means continuously connecting one side of said pitch changing motor with said one fluid pressure, and means alternatively connecting the opposite side of said pitch changing motor with said second fluid pressure or with drain.

6. In combination with a hydro-controllable propeller having a pitch changing motor operable in one direction by one fluid pressure and operable in the opposite direction by a second fluid pressure acting against said one fluid pressure, a hydraulic servo-mechanism including a pump, means for supplying hydraulic fluid under said one pressure to the intake of said pump, a fluid chamber connected with the outlet of said pump, a pressure relief valve connected with said chamber and urged toward open position to vent said chamber by the pressure of hydraulic fluid in said chamber to establish said second pressure in said chamber, means for applying the pressure of hydraulic fluid at said one pressure to said valve to counteract the effect of an equal pressure in said fluid chamber tending to open said valve, means in addition to said fluid pressure resiliently urging said valve toward closed position with a predetermined force to maintain the fluid pressure in said chamber a predetermined amount above the fluid pressure at said pump intake, means continuously connecting one side of said pitch changing motor with said one fluid pressure, means alternatively connecting the opposite side of said pitch changing motor with said pressure chamber or with drain, and speed responsive means for controlling the operation of said alternative connecting means.

7. In combination with a hydro-controllable propeller having a pitch changing motor operable in one direction by one fluid pressure and the effect of centrifugal force on the propeller blades and operable in the opposite direction by a second fluid pressure alone acting against said one fluid pressure and the effect of centrifugal force on the said blades, a hydraulic servo-mechanism including a pump, means for supplying hydraulic fluid under said one pressure to the intake of said pump, a fluid chamber connected with the outlet of said pump, a pressure relief valve connected with said chamber and urged toward open position to vent said chamber by the pressure of hydraulic fluid in said chamber, said valve comprising a hollow piston having a port therein for venting said chamber, means for guiding said piston, and means connecting the space at the end of said piston opposite said fluid chamber with said pump intake for applying fluid pressure from said fluid supply means to urge said valve toward closed position, means in addition to said fluid pressure resiliently urging said valve toward closed position with a predetermined force to maintain the fluid pressure in said chamber a predetermined amount above the pressure of the fluid supplied to said pump, means continuously connecting one side of said pitch changing motor with said one fluid pressure, and means alternatively connecting the opposite side of said pitch changing motor with said pressure chamber or with drain.

8. In combination with a hydro-controllable propeller having a pitch changing motor operable in one direction by one fluid pressure and the effect of centrifugal force on the propeller blades and operable in the opposite direction by a second fluid pressure alone acting against said one fluid pressure and the effect of centrifugal force on the said blades, a hydraulic servo-mechanism including a pump, means for supplying hydraulic fluid under said one pressure to the intake of said pump, a fluid chamber connected with the outlet of said pump, a pressure relief valve connected with said chamber and urged toward open position to vent said chamber by the pressure of hydraulic fluid in said chamber to establish said second pressure in said chamber, said valve comprising a hollow piston having a port therein for venting said chamber, a hollow guide telescopically associated with said piston having apertures for admitting hydraulic fluid from said means for supplying hydraulic fluid under said one pressure to the interior of said hollow guide and hollow piston, and a compression spring in said hollow guide acting against said piston to resiliently urge the piston to valve closing position to maintain said second pressure a predetermined amount above said one pressure, means continuously connecting one side of said pitch changing motor with said one fluid pressure, and means alternatively connecting the opposite side of said pitch changing motor with said pressure chamber or with drain.

9. In combination with a hydro-controllable propeller having a pitch changing motor operable in one direction by one fluid pressure and operable in the opposite direction by a second fluid pressure acting against said one fluid pressure, a hydraulic servo-mechanism including a pump, means for supplying hydraulic fluid to said pump, a pressure chamber for receiving the output of said pump, a pressure relief valve for said pressure chamber for establishing said second pressure, a spring urging said valve to closed position, means for supplying hydraulic fluid at said one pressure to said valve to exert a valve closing force in addition to the force exerted by said spring to maintain said second pressure a predetermined amount above said one pressure, and means for alternatively connecting one side of said pitch changing motor with said second pressure or with drain.

ERLE MARTIN.